(12) United States Patent
Hsieh et al.

(10) Patent No.: US 8,850,567 B1
(45) Date of Patent: Sep. 30, 2014

(54) UNAUTHORIZED URL REQUESTS DETECTION

(75) Inventors: Sheng-Chi Hsieh, Xindian (TW); Jui-Pang Wang, Banciao (TW); Chao-Yu Chen, Taipei (TW)

(73) Assignee: Trend Micro, Inc., Tokyo (JP)

( * ) Notice: Subject to any disclaimer, the term of this patent is extended or adjusted under 35 U.S.C. 154(b) by 1136 days.

(21) Appl. No.: 12/025,559

(22) Filed: Feb. 4, 2008

(51) Int. Cl.
*H04L 29/00* (2006.01)
*G06F 11/00* (2006.01)
*H04L 29/06* (2006.01)

(52) U.S. Cl.
CPC ............. *H04L 63/1483* (2013.01); *H04L 63/14* (2013.01); *H04L 63/1441* (2013.01); *G06F 2221/2219* (2013.01); *H04L 63/10* (2013.01)
USPC .............................................. 726/22; 726/23

(58) Field of Classification Search
None
See application file for complete search history.

(56) References Cited

U.S. PATENT DOCUMENTS

| | | | |
|---|---|---|---|
| 5,021,997 A | 6/1991 | Archie et al. | |
| 5,796,952 A | 8/1998 | Davis et al. | |
| 6,856,989 B1 | 2/2005 | Zhou et al. | |
| 7,089,325 B1 | 8/2006 | Murtza et al. | |
| 7,251,827 B1 | 7/2007 | Guo et al. | |
| 7,343,626 B1 | 3/2008 | Gallagher | |
| 7,359,976 B2 | 4/2008 | Ross et al. | |
| 7,472,413 B1 * | 12/2008 | Mowshowitz | 726/10 |
| 7,827,311 B2 * | 11/2010 | Cooley et al. | 709/245 |
| 8,584,232 B2 * | 11/2013 | Kerschbaum | 726/22 |
| 2002/0040395 A1 | 4/2002 | Davis et al. | |
| 2002/0099812 A1 | 7/2002 | Davis et al. | |
| 2003/0028532 A1 * | 2/2003 | Dougu et al. | 707/9 |
| 2003/0065770 A1 | 4/2003 | Davis et al. | |
| 2003/0159063 A1 | 8/2003 | Apfelbaum et al. | |
| 2004/0103200 A1 | 5/2004 | Ross et al. | |
| 2004/0139143 A1 * | 7/2004 | Canakapalli et al. | 709/200 |
| 2005/0021791 A1 | 1/2005 | Sakiyama et al. | |
| 2006/0230058 A1 | 10/2006 | Morris | |
| 2007/0113282 A1 | 5/2007 | Ross | |
| 2007/0234409 A1 | 10/2007 | Eisen | |
| 2008/0064501 A1 | 3/2008 | Patel | |
| 2008/0127338 A1 | 5/2008 | Cho et al. | |
| 2008/0168558 A1 * | 7/2008 | Kratzer et al. | 726/23 |
| 2008/0222244 A1 * | 9/2008 | Huang et al. | 709/203 |

(Continued)

OTHER PUBLICATIONS

Jovanovic, Nenad; Kirda, Engin; Kruegel, Christopher; , "Preventing Cross Site Request Forgery Attacks," Securecomm and Workshops, 2006 , vol., no., pp. 1-10, Aug. 28, 2006-Sep. 1, 2006 DOI=10.1109/SECCOMW.2006.359531.*

(Continued)

*Primary Examiner* — Alexander Lagor
(74) *Attorney, Agent, or Firm* — Beyer Law Group LLP

(57) ABSTRACT

Unauthorized URL requests are detected based on individual user's access map(s). An access map describes legitimate paths that a user may be led from one URL to another URL. Additional information on individual URLs forming the paths, such as whether a particular URL is a start URL or a critical URL, is also included in the access map. The access map may be updated based on the most currently available information. When a URL request is made from a client device associated with a user, and it if is determined that the requested URL may potentially suffer from CSRF attacks, then the requested URL and its referral URL are compared against the URL paths in the user's access map to determine whether the URL request is unauthorized. If so, then an alert may be raised.

15 Claims, 10 Drawing Sheets

(56) References Cited

U.S. PATENT DOCUMENTS

| | | | |
|---|---|---|---|
| 2008/0222736 A1* | 9/2008 | Boodaei et al. | 726/27 |
| 2008/0263650 A1* | 10/2008 | Kerschbaum | 726/9 |
| 2009/0043765 A1 | 2/2009 | Pugh | |
| 2009/0112814 A1 | 4/2009 | Statia et al. | |
| 2009/0119769 A1 | 5/2009 | Ross et al. | |
| 2009/0328187 A1* | 12/2009 | Meisel | 726/13 |

OTHER PUBLICATIONS

Wim Maes, Thomas Heyman, Lieven Desmet, and Wouter Joosen. 2009. Browser protection against cross-site request forgery. In Proceedings of the first ACM workshop on Secure execution of untrusted code (SecuCode '09). ACM, New York, NY, USA, 3-10. DOI=10.1145/1655077.1655081 http://doi.acm.org/10.1145/1655077.1655081.*

Adam Barth, Collin Jackson, and John C. Mitchell. 2008. Robust defenses for cross-site request forgery. In Proceedings of the 15th ACM conference on Computer and communications security (CCS '08). ACM, New York, NY, USA, 75-88. DOI=10.1145/1455770.1455782 http://doi.acm.org/10.1145/1455770.1455782.*

Kirda, E., Kruegel, C., Vigna, G., & Jovanovic, N. (Apr. 2006). Noxes: a client-side solution for mitigating cross-site scripting attacks. In Proceedings of the 2006 ACM symposium on Applied computing (pp. 330-337). ACM.*

Cross-Site Request Forgery, SPI Dynamics Inc., 2007 (20 pages).

Jovanovic et al., "Preventing Cross Site Request Forgery Attacks," ISBN: 1-4244-0423-1, Aug. 28, 2006 (10 pages).

Burns, "Cross Site Reference Forgery," Information Security Partners LLC, 2005 (9 pages).

Office Action in U.S. Appl. No. 11/972,823, mailed Nov. 29, 2010.

Office Action in U.S. Appl. No. 11/962,795, mailed Oct. 15, 2010.

Office Action in U.S. Appl. No. 11/962,795, mailed Mar. 31, 2011.

Office Action in U.S. Appl. No. 11/972,823, mailed Apr. 27, 2011.

* cited by examiner

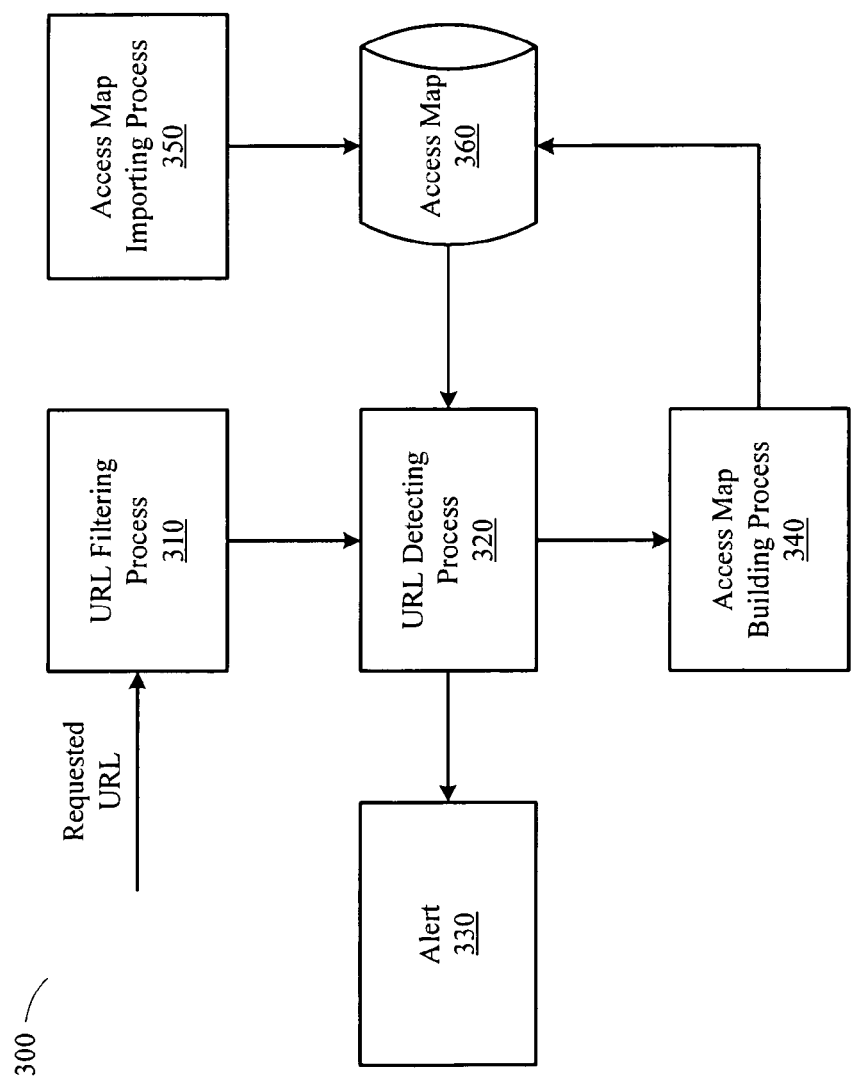

UNAUTHORIZED URL REQUESTS DETECTION

FIELD OF THE INVENTION

The present invention generally relates to detecting cross-site request forgery (CSRF or XSRF). More specifically, the present invention relates to using access maps to detect unauthorized URL (Uniform Resource Locator) requests, i.e., URL requests sent from user client devices to web application servers without the users' awareness and/or permission.

BACKGROUND OF THE INVENTION

Cross-site request forgery, also known as one click attack or session riding, is a type of malicious exploit of websites that transmits unauthorized requests or commands from a user whom a website trusts to the website through a client device associated with the user, thus tricking the web application server hosting the website into responding to the unauthorized requests or commands. The requests or commands are unauthorized because they are sent to the website without the user's knowledge and/or permission. CSRF takes advantage of the trust a website places in an authorized or authenticated user. CSRF attacks often target websites that rely on a user's identity and exploit the websites' trust in that user identity by tricking the user's web browser into sending HTTP (Hypertext Transfer Protocol) requests to the targeted websites without the user's knowledge or permission, while the HTTP requests have harmful and/or malicious side effects.

From a technical point of view, CSRF often relies on a few assumptions. First, the attacker has knowledge of the websites with which the victim user has current authentication. Next, the attacker generally targets websites that use persistent authentication cookies or users whose web browsers have current session cookies. Finally, the targeted websites do not employ any secondary authentication for client requests.

CSRF may cause various types of harm and damages to both the users and the websites. For example, CSRF may send an unauthorized request to a user's bank website to transfer money out of the user's bank account, or send an unauthorized request to a website where the user has a registered account to reset the user's account information such as login or password, etc.

Some methods have been developed to detect CSRF attacks. For example, a web application may switch from a persistent authentication method to a transient authentication method, or include a secret, user-specific token in forms that is verified in addition to the cookies. Alternatively, a web application may check the HTTP referrer header to see if the request comes from an authorized page. A server-side proxy may also be used to detect and prevent CSRF attacks as well. Other methods include using cryptographic tokens to prove that the sender of the requests knows a session-specific secret parameter, or using secret tokens to prove that the sender of the requests knows an action- and user-specific secret parameter.

However, most of the existing methods for detecting and/or preventing CSRF attacks are implemented on the server side, often as a part of the web application. Thus, unless the web servers implement functionalities to protect the users from CSRF attacks, the users are left vulnerable. Therefore, continuous efforts are needed to improve CSRF detection and prevention.

SUMMARY OF THE INVENTION

Broadly speaking, the present invention generally relates to detecting cross-site request forgery. More specifically, the present invention relates to using access maps to detect unauthorized URL requests, i.e., URL requests sent from user client devices to the web application servers without the users' awareness and/or permission.

According to various embodiments, an access map is constructed for each user, which describes legitimate paths that may lead the user from one URL to another URL. Optionally, a different access map may be constructed for URL paths for each domain that the user visits. A URL may correspond to a web page, a file, a piece of script code, etc. The user may traverse from a first URL to a second URL to a third URL and so on, thus forming a path of URLs.

For example, suppose the first URL corresponds to a first web page. The user loads the first web page in a web browser. The first web page contains a link to the second URL, which corresponds to a second web page. By clicking on the link to the second URL from the first web page, the user is led to the second web page. In this case, the user may be considered as being "referred" to the second URL, i.e. the second web page, from the first URL, i.e., the first web page. Thus, with respect to the second URL, the first URL is its referral URL. On the other hand, the user starts from the first URL, e.g., by entering the first URL directly into the web browser. Thus, the first URL does not have a referral URL and maybe considered as a starting URL.

Some URLs may be considered critical because these URLs correspond to objects, e.g., web pages, that perform important operations. In addition to the URL paths, information such as which URLs on the paths are considered as starting URLs and which URLs are considered as critical URLs may also be included in the access map. An access map may be updated from time to time or as necessary as new information becomes available. The user's access map may be used to determine whether a URL request sent from the user's client device to a web application server is legitimate or authorized. The URL request may be sent using, for example, HTTP.

When a URL request is sent to a web application server from the user's client device, and if it is determined that the requested URL may suffer from CSRF attacks, then the requested URL's referral URL, if one exists, is identified. The requested URL and its referral URL are compared against the user's access map. If the requested URL and its referral URL are not found in the user's access map, then it is possible that the URL request is not authorized. In general, if the requested URL and its referral URL belong to different domains and the requested URL is considered a critical URL, then the URL request is likely to be unauthorized, i.e., a CSRF attack. In this case, an alert may be raised. Otherwise, the URL request is likely to be legitimate. In this case, the requested URL and its referral URL may be added to the user's access map.

The URL request detection process may be performed either on the client device or on the server. Optionally, a back-end server may be used to manage access maps associated with multiple users, such as storing access maps in a database, facilitating the exchange of access map data among the users, etc.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates a system for detecting unauthorized URL requests using an access map according to one embodiment of the invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

Figure 1:
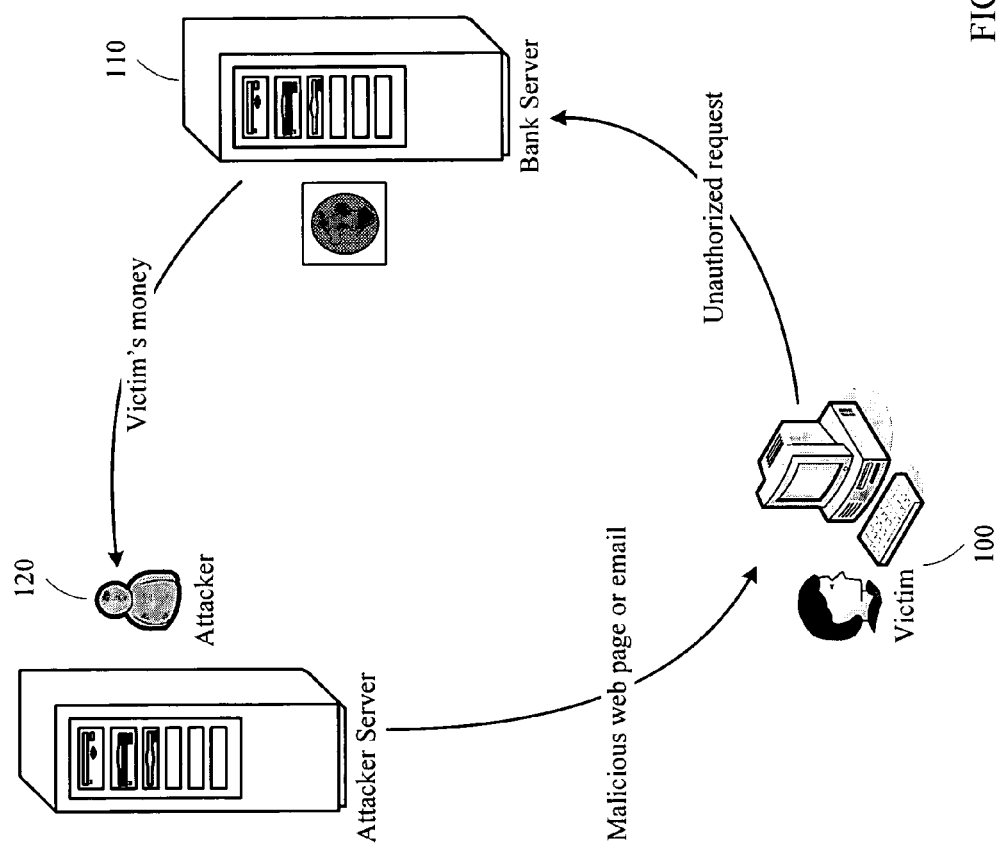
FIG. 1 (prior art) illustrates a sample scenario of a cross-site request forgery attack.

Cross-site request forgery (CSRF or XSRF) is a type of malicious attack that exploits a website's trust in its users by sending unauthorized requests or commands from a client device associated with a user that the website trusts, e.g., a user who has been authenticated by the web server hosing the website, to the website. FIG. 1 illustrates a sample scenario of a CSRF attack.

In this scenario, victim 100 is a legitimate user of a bank's website 110 and conducts online banking transactions at the bank's website 110. Attacker 120 sends a malicious email to victim 100 or victim 100 downloads a malicious web page designed by attacker 120. The malicious email or web page contains a hidden HTTP request to the bank's website 110. For example, the request may direct the bank's website 110 to transfer money from victim's 100 bank account to attacker's 120 account.

When victim 100 reads the malicious email using an email application program or views the malicious web page in a web browser, the hidden HTTP request is automatically sent to the bank's website 110 without victim's 100 knowledge and authorization. However, the web server hosting the bank's website 110 believes the request to be legitimate because it is sent from victim's 100 client device, an authorized user of the bank's website 110. The bank's web server 110 complies with the fraudulent request and transfers money from victim's 100 account to attacker's 120 account.

CSRF attacks exploit the stateless nature of the Hypertext Transfer Protocol. HTTP, in itself, is not able to determine which request sent to a website is from which user or whether multiple requests are sent from the same user. This is problematic especially when a website, i.e., the web server hosting the website, needs to support user authentication, such as in the case of a bank's online banking website. One way to overcome the problem and to help identify the sender of a request is using client-side cookies to preserve user-specific state. Once a user has been authenticated by a website, e.g., based on a login and a password, the web server hosting the website instructs the web browser used by the authenticated user to create a cookie with a unique pair of name and value, which may then be used to identify subsequent requests from that particular user. The cookie is stored in the user's web browser and remains there for some period of time, such as throughout the current session or until the user logs out the website. While the cookie remains valid, the web browser automatically includes the cookie in all requests sent to the website from the user, and thus, identifies to the web server that the requests come from the authenticated user.

CSRF attacks take advantage of these persistent authentication cookies or current session cookies. For example, in the scenario described in FIG. 1, suppose victim 100 logs onto the bank's website 110 and is authenticated. A cookie is stored in victim's 100 web browser. Before the cookie is discarded, e.g., before victim 100 logs out of the bank's website 110, attacker 120 sends a malicious web page, which contains the hidden request, to victim 100. Victim 100 views the web page in his or her web browser, which causes the web browser to send the fraudulent request to the bank's website 110 with victim's 100 authentication cookie included. Upon receiving the fraudulent request, the bank's web server 110 is tricked into believing that the request is sent by victim 100 since it includes victim's 100 unique identification cookie and complies with the fraudulent request.

To detect such fraudulent and unauthorized requests, according to various embodiments of the present invention, one or more access map(s) is/are constructed for each user, which describes the legitimate paths the user may take that lead the user from one URL to another URL. A URL may correspond to a web page, a file, such as an image file, a video file, an audio file, a text file, etc., a piece of script code, etc. The user may traverse from a first URL to a second URL to a third URL and so on, thus forming various paths of URLs.

For example, to request a fund transfer at a bank's website, a legitimate path may lead the user from a login page to an account summary page to a fund transfer page and finally to a fund transfer confirmation page. To request a bill payment, a legitimate path may lead the user from the login page to a checking account page to a bill-pay page to a payment information page and finally to a bill-pay confirmation page. Each of these pages corresponds to a unique URL. These URL paths are included in the user's access map, which describe which URL leads to which other URLs.

When the user traverse from the first URL to the second URL, the first URL is considered a referral URL of the second URL, since it may be considered that the user is referred to the second URL from the first URL.

In addition, the access map may mark those URLs that are considered critical, i.e., URLs that involve important or critical operations. For example, the fund transfer page or the payment information page may be considered critical to a bank's website because these pages contain operations that result in money being taken out of the user's account. Thus, these pages' URLs would be marked as critical in the access map.

The access map may also mark those URLs that are considered starting points, i.e., URLs from where the user starts his visit to a website or domain. For example, the login page at the bank's website would be considered a start URL, since the user needs to log onto the website first before conducting any online banking activities.

Once an access map is constructed for a user, it may be used to detect unauthorized URL requests sent using, for example, HTTP, to a website. More specifically, a request of a critical URL that does not follow any legitimate paths in the user's access map may be considered fraudulent and result in an alert being raised.

For example, if the user's access map indicates that the legitimate path generally leads the user from the account summary page to the fund transfer page, then a request for the fund transfer page, which is a critical URL, that comes from a web page other than the account summary page, and especially from a web page that is not a part of the bank's website, e.g., a web page that belongs to a different domain, may very well be a CSRF attack.

There are different ways to construct access maps for a user. In some embodiments, a different access map is constructed for each domain the user visits. For example, the user may be a customer of a bank's website whose domain name is bank.com. Thus, an access map may be constructed for the user for the domain bank.com. At the same time, the user may also be a customer of an online shopping website whose domain name is shop.com. Thus, another access map may be constructed for the user for the domain shop.com. In this case, the user has two access maps. Of course, there is no limit on how many access maps a user may have. In fact, a user may have many access maps, one for each domain the user visits.

In other alternative embodiments, a single access map may be constructed for a user that includes all the domains the user visits. In this case, the access map may have a much bigger size, especially if the user visits many websites, since it includes URL paths from multiple domains. It may take longer time to search through this access map to find a pair of access URL and referral URL, due to its large size. In addition, maintenance for such large access maps may be more complicated and time consuming.

Figure 2A:
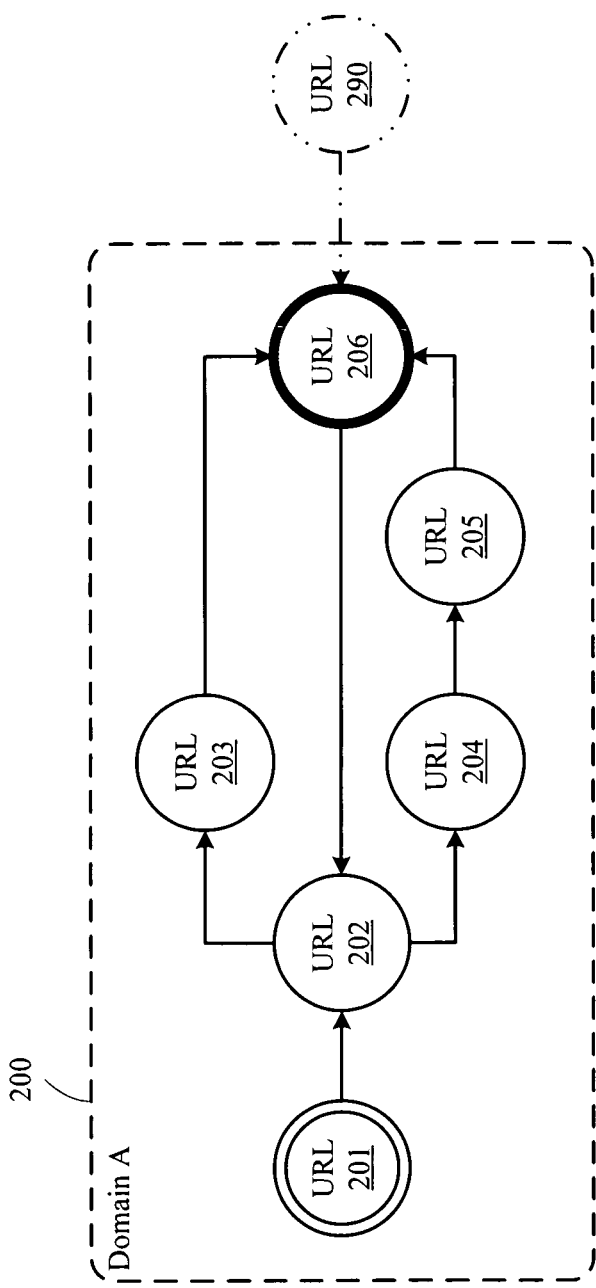
FIG. 2A illustrates a simplified sample access map that includes URL paths from a single domain.

FIG. 2A illustrates a simplified sample access map 200 that includes URL paths from a single domain, domain A. Typically, when a user visits a domain, e.g., a website, the user starts with the website's home page or login page. From there, the user may click on various URL hyperlinks contained in each web page and be led to the next web page corresponding to the URL that the user has clicked on, and so on.

The web page that the user starts his or her visit to a domain is a starting page and its corresponding URL a starting URL. There may be multiple starting URLs within a single domain. For example, a starting URL may corresponds to a home page, e.g., www.website.com/index.html, www.website.com/index.htm, or www.website.com/default.htm, a login page, e.g., www.website.com/login.html, a page that the user has bookmarked in his or her web browser, e.g., www.website.com/myaccount.html, a famous hyperlink, e.g., a link that has many back-links, etc. In some cases, if a URL does not have any referral URLs, it may be considered a starting URL. However, URLs without referral URLs are not always considered starting URLs. Sometimes, a URL without any referral URLs still may not be considered a starting URL despite its lacking of referral URLs. On the other hand, it is possible for a starting URL to have one or more referral URLs, and thus, not all starting URLs in an access map lack referral URLs.

In access map 200, the user starts with URL 201, which may correspond to the website's home page, page 201. URL 201 is therefore a starting URL in domain A. Page 201 contains a hyperlink to URL 202 that corresponds to another web page in domain A, page 202. When the user clicks on this hyperlink to URL 202, he or she is led to page 202. With respect to URL 202, URL 201 may be considered its referral URL, because the user is referred from page 201 to page 202 by clicking on the hyperlink to URL 202 contained in page 201. In other words, the user is referred to URL 202 from URL 201. A URL may have multiple referral URLs, and similarly, a URL may be the referral URL for multiple other URLs.

From page 202, the user has two choices, i.e., there are two hyperlinks contained in page 202, one linking to URL 203 which corresponds to web page 203 and the other linking to URL 204 which corresponds to web page 204. The user may click on the URL 203 link and be led to page 203. Alternatively, the user may click on the URL 204 link and be led to page 204. Here, URL 202 is a referral URL for both URLs 203 and 204.

From page 203, the user may click on a hyperlink to URL 206 and be led to web page 206 directly. From page 204, the user may click on a hyperlink to URL 205 and be led to web page 205, and then from page 205, the user may click on a hyperlink to URL 206 and be led to page 206. Thus, there are two paths from URL 202 to URL 206: one path via URL 203 and the other path via URLs 204 and 205. Finally, page 206 contains a hyperlink to URL 202, which may lead the user back to page 202. Here, URL 206 has two referral URLs: URL 203 and URL 205. Similarly, URL 202 has two referral URLs: URL 201 and URL 206.

Some URLs may be considered critical to a domain because they involve important operations or perform important functions. Often, CSRF attacks target these critical URLs especially, and therefore, such critical URLs need to be protected more diligently. Whether a particular URL is considered critical to a domain depends on the domain itself. For example, to a bank's website, a fund transfer page or a bill-pay page may be considered critical, whereas a balance display page may not be considered critical. To an online shopping website, a payment page or an account information page may be considered critical, whereas a product description page may not be considered critical. In other words, a domain may designate any of its URLs as critical or specify any criteria for determining critical URLs.

Often, URLs that require secure access, i.e., URLs having a scheme of "https://", may be more critical than non-secure URLs, i.e., URLs having a scheme of "http://". URLs that have deeper access paths, i.e., URLs that require users to go through many other URLs in order to arrive at, may be considered more critical. Conversely, URLs corresponding to static web pages and web pages from certain types of websites, such as search engine sites, are usually not critical.

In FIG. 2A, suppose URL 206 is a critical URL for domain A. If a request for URL 206 is sent to the web application server hosting domain A from a user's client device and access map 200 belongs to the user, then access map 200 may be used to determine whether the request for URL 206 is legitimate or fraudulent. Specifically, the URL where the request for URL 206 comes from, i.e., the referral URL, is compared with the known legitimate referral URLs for URL 206 in access map 200. If, for example, the request for URL 206 comes from URL 203 or URL 205, then it is almost certainly a legitimate request. On the other hand, if, according to access map 200, the request for URL 206 comes from a URL that is not a known referral URL for URL 206, such as from URL 290, then it is likely that the request is unauthorized, in which case an alert may be raised. The likelihood that the request for URL 206 is unauthorized increases when URL 290 belongs to a different domain, i.e., not a part of domain A, making it a cross-domain or cross-site request.

Of course, not all cross-site URL requests, i.e., requests sent from URLs in one domain to request URLs in another domain, are fraudulent. There are many situations where a cross-site request for a URL, especially for a non-critical URL, may be legitimate. For example, suppose a user searches for some information at a first website that provides a search engine. The search result may include links to URLs belonging to other websites that correspond to web pages having the information the user is searching for. It is often likely that these URLs are not considered starting URLs for their respective websites. It is even possible that some of these URLs may be considered critical URLs for their respective websites. If the user clicks on one of these URL links belonging to a second website, it will result in a cross-site URL request, but such a request is generally considered legitimate and no alert should be raised. In some embodiments, a warning may be raised, such as in the case where the requested URL is considered a critical URL, to give the user the option of authorizing such a cross-site URL request.

Figure 2B:
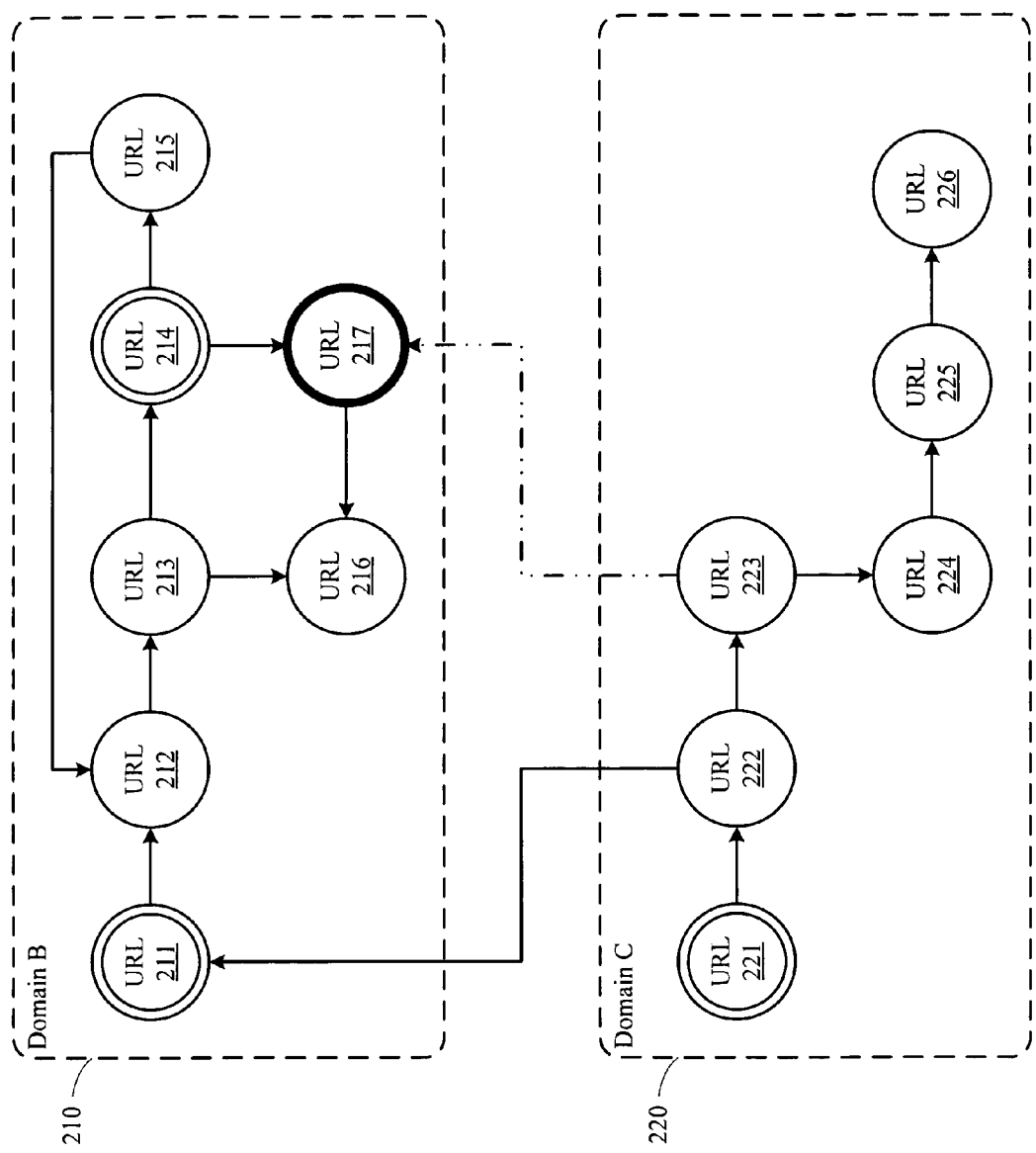
FIG. 2B illustrates two simplified sample access maps that include URL paths from two separate domains respectively and paths across the two domains.

FIG. 2B illustrates two simplified sample access maps 210 and 220 that include URL paths from two domains, domain B and domain C, respectively and paths across the two domains. In access map 210 for domain B, there are two starting URLs: URL 211 and URL 214, and one critical URL: URL 217. From starting URL 211, a user may go through URLs 212, 213, and 214 to arrive at critical URL 217. Alternatively, from starting URL 214, the user may directly go to critical URL 217. In access map 220 for domain C, there is one starting URL: URL 221, and no critical URL.

From URL 222 in domain C, a user may be led to URL 211 in domain B, and this may be a legitimate path crossing the two domains. For example, domain C may be a website that hosts a search engine. A user starts with the website's home page, page 221, and types in a search term. Next, the user is directed to web page 222, which contains hyperlinks to his or her search results. One of the hyperlinks contained in web page 222 is URL 211, which corresponds to the home page of domain B, page 211. The user clicks on the hyperlink to URL 211 and is led to page 211 in domain B. In this case, the path from URL 222 to URL 211 is legitimate, i.e., the request for URL 211 from URL 222 is authorized, and URL 222 is a legitimate referral page for URL 211. On the other hand, a request may be made for URL 217, a critical URL for domain B, from URL 223 in domain C. This request may be unauthorized if there is no legitimate reason for URL 223 to send a request for URL 217.

The sample access maps 200, 210, 220 are over-simplified for illustrating purposes. In practice, an access map often contains many URL paths and may indeed be very complex.

The initial construction of a new access map for a user may incorporate information from various sources. First, with respect to information associated with the user, URL paths in the access map may be constructed by tracking the user's online activities and especially the user's browsing history. For example, web browsers usually track the web pages a user has visited recently, and this data may be used to construct some of the URL paths in the user's access map. Alternatively, a proxy may be installed on the user's computer system, which records the URLs and domains the user visits.

Next, with respect to information associated with a particular domain or website, the web pages in the domain may be analyzed for hyperlinks contained therein. URL paths in the access map may be constructed by systematically tracing every hyperlink contained in every web page. An access map constructed using such information may be more comprehensive, since it may potentially include every possible URL path within a domain. On the other hand, the access map may also be very large in size, since a domain often includes hundreds, even thousands of web pages, each containing multiple hyperlinks. Furthermore, the access map may include paths that are not particularly applicable to a particular user, since it is unlikely that a user is able to traverse every possible URL path within a domain.

Finally, access maps belonging to other users may be imported for the user, if the user visits similar domains or websites as the other users. For example, a bank's customers often perform similar activities at the bank's online banking website, such as checking balances, transferring funds, paying bills, etc. Therefore, URL paths from one customer's access map may be imported into another customer's access map.

Different data types may be used to represent URL paths in access maps. For example, the table below shows one example of representing the paths in access map 200 illustrated in FIG. 2A.

| Requested URL | Referral URL | Starting URL | Critical URL | Timestamp |
|---|---|---|---|---|
| URL 201 (e.g., https://www.bank.com/login.cgi) | None | Yes | No | 391758 |
| URL 202 (e.g., https://www.bank.com/account.cgi) | URL 201 (e.g., https://www.bank.com/login.cgi) | No | No | 491758 |
| URL 202 (e.g., https://www.bank.com/account.cgi) | URL 206 (e.g., https://www.bank.com/transfer.cgi) | No | No | 427654 |
| URL 203 (e.g., https://www.bank.com/fillform.cgi) | URL 202 (e.g., https://www.bank.com/account.cgi) | No | No | 581735 |
| URL 204 (e.g., https://www.bank.com/balance.cgi) | URL 202 (e.g., https://www.bank.com/account.cgi) | No | No | 285645 |
| URL 205 (e.g., https://www.bank.com/billpay.cgi) | URL 204 (e.g., https://www.bank.com/balance.cgi) | No | No | 662745 |
| URL 206 (e.g., https://www.bank.com/transfer.cgi) | URL 203 (e.g., https://www.bank.com/fillform.cgi) | No | Yes | 715543 |
| URL 206 (e.g., https://www.bank.com/transfer.cgi) | URL 205 (e.g., https://www.bank.com/billpay.cgi) | No | Yes | 481267 |

In the above table, for each URL that is being requested, i.e., the requested URL, its referral URL is recorded. In addition, whether the requested URL is considered a starting URL or a critical URL for the domain is marked. Furthermore, a timestamp indicating the most-recent time the requested URL is requested is recorded as well. Access map construction and maintenance will be described further in FIGS. 4 and 7 below. Once an access map has been constructed for a user, it may be used to detect unauthorized URL requests.

FIG. 3 illustrates a system 300 for detecting unauthorized URL requests using an access map according to one embodiment of the invention. According to this embodiment, the detection system 300 includes several components, each configured to perform different functionalities. When a user's client device requests a URL, the requested URL is first filtered by the URL filtering process 310, which filters out those URLs that do not need to be checked. If the URL filtering process 310 determines that the requested URL needs to be checked, then it is passed onto the URL detecting process 320 to determine whether the requested URL is unauthorized using the user's access map 360. If the URL detecting process 320 determines that the requested URL is fraudulent, then an alert is raised 330. On the other hand, if the requested URL is legitimate, then it is sent to the access map building process 340 so that the user's access map 360 may be updated. In addition, there is an access map importing process 350 that is responsible for maintaining the user's access map 360 by importing information from various sources. These processes are described in more detail in FIGS. 4-7 respectively.

Figure 4:
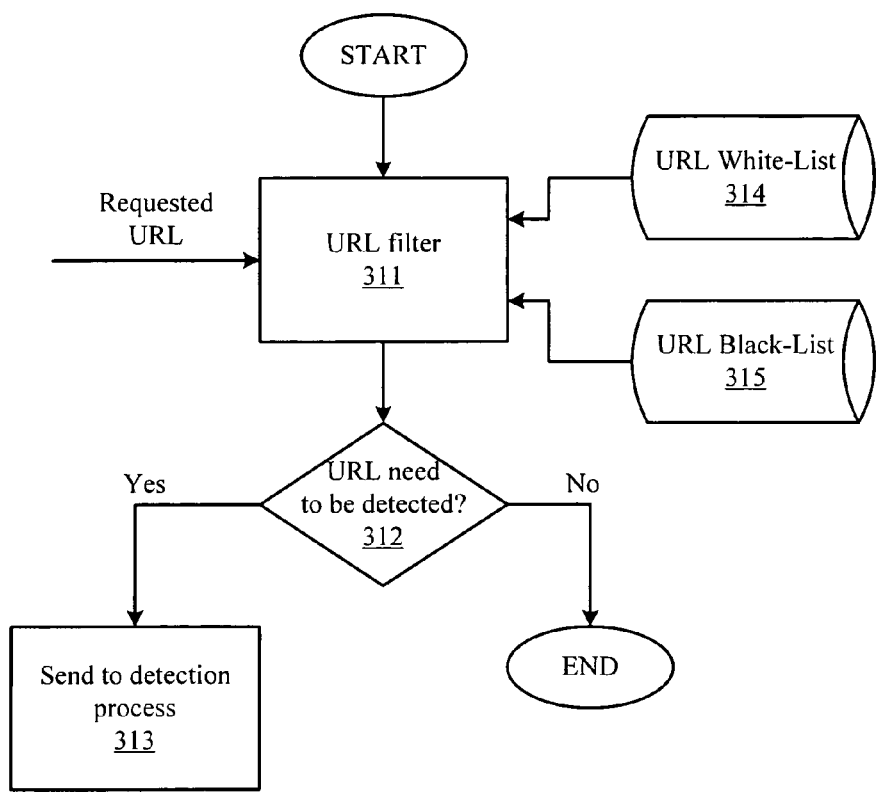
FIG. 4 illustrates a URL filtering process according to one embodiment of the invention.

FIG. 4 illustrates a URL filtering process 310 according to one embodiment of the invention. The URL filtering process 310 filters out those requested URLs that do not need to be checked, because certain types of URLs do not suffer from CSRF attacks. For example, URLs that correspond to static web pages, image files, video files, audio files, Flash files, scripts, and Cascading Style Sheets (CSS) usually do not suffer from CSRF attacks and thus do not need to be checked. These types of URLs may be predefined so that the URL filtering process 310 is aware of them. In addition, there may be a list of trusted URLs that is known to be safe. Such trusted URLs may be included in a URL white-list 314, and all URLs from the white-list 314 do not need to be checked.

By filtering out those URLs that do not need to be checked, the number of requested URLs sent to the URL detection process 320 may be greatly reduced, which in turn reduces the processing time for responding to a URL request. Furthermore, since these types of URLs are known to be safe, it is not necessary to include them in the access maps if they are first filtered out, thus reducing the size and complexity of the access maps.

According to this embodiment, the requested URL is sent to the URL filter 311. The URL filter 311 is aware of the types of URLs that do not need to be checked, and may determine whether the requested URL falls within one of those types of URLs. If so, then the requested URL does not need to be sent to the URL detection process 320. In addition or alternatively, the URL filter 311 may compare the requested URL with the URL white-list 314 to determine whether the requested URL is on the white-list 314. If the requested URL is on the white-list 314, then it is considered safe and does not need to be checked.

Conversely, the URL filtering process 310 may be aware of certain types of URLs that are considered vulnerable to CSRF attacks, and/or maintain a URL black-list 315, such that all the URLs falling within one of those vulnerable types or on the black-list 315 are considered dangerous and need to be checked always. If the requested URL falls within one of the vulnerable types or is on the black-list 315, then the URL filtering process sends it to the URL detection process 320.

Both the URL white-list 314 and black-list 315 may be predefined and may be updated from time to time when new information becomes available. Safe URLs may be added to the white-list 314 while dangerous URLs may be added to the black-list 315. In addition, URLs may be removed from the white-list 314 when they are no longer considered to be safe or from the black-list 314 when they are no longer considered to be dangerous.

If the requested URL needs to be checked (step 312), then it is sent to the URL detection process 320 (step 313). Otherwise, the requested URL is considered safe and no checking is needed. In this case, the requested URL is forwarded to the web application server for normal processing.

Figure 5:
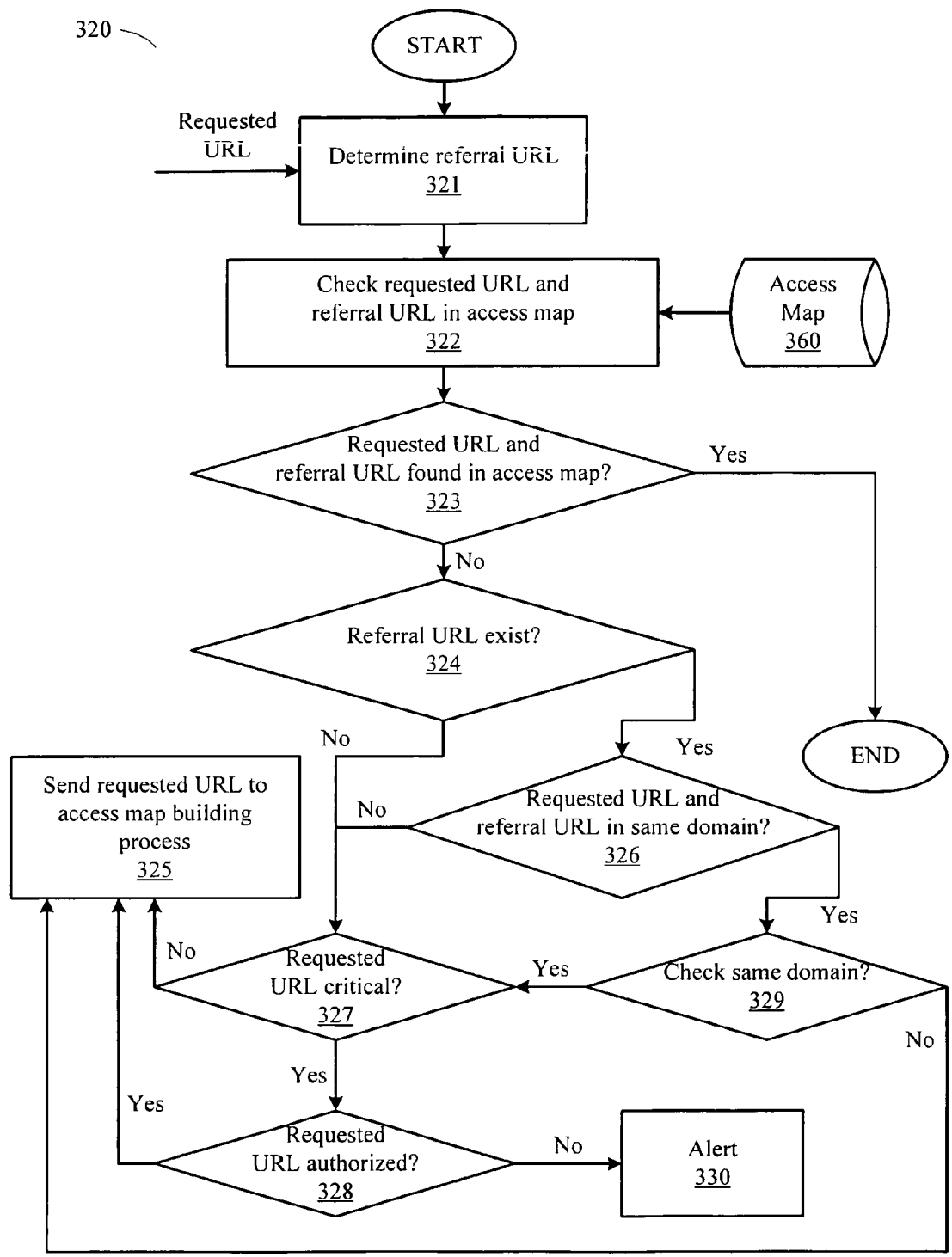
FIG. 5 illustrates a URL detecting process according to one embodiment of the invention.

FIG. 5 illustrates a URL detecting process 320 according to one embodiment of the invention. All requested URLs that have passed through the URL filtering process 310, i.e., URLs that may suffer from CSRF attacks, are sent to the URL detecting process 320 for verification.

According to this embodiment, when the URL detecting process 320 receives a requested URL, it first determines the referral URL corresponding to the requested URL (step 321). The referral URL is the URL from where the URL request is sent. To identify the referral URL associated with the requested URL, the URL detecting process 320 may examine the current URL being loaded in the user's web browser, or the browser's history list, etc.

Next the pair of requested URL and referral URL is checked against the user's access map 360 (step 322). Since the access map 360 contains legitimate paths that lead from one URL to another URL, if the pair of requested URL and referral URL is found in the access map 360 (step 323), then the request is authorized. Alternatively or in addition, if the requested URL is found in the access map 360, and in the access map 360, this URL, i.e., the requested URL, is marked as a starting URL, then the request is considered authorized regardless of whether there is a referral URL associated with the requested URL. In these cases, no more detection is needed. The URL request may be forwarded to the web application server to be processed. On the other hand, if the pair of requested URL and referral URL is not found in the access map 360 (step 323), then it is possible that the requested URL may be unauthorized. In this case, more checking is needed.

The URL detecting process 320 determines whether the requested URL has a referral URL (step 324). There are various reasons that a requested URL may not have a referral URL. For example, if the requested URL is a starting URL, then sometimes it may not have a referral URL. Alternatively, it may be possible that the process is unable to determine the corresponding referral URL for the requested URL at step 321. Regardless of the actual reason, if there is no referral URL associated with the requested URL, the requested URL is sent to steps 327 and 328 (see below) to be verified for unauthorized URL request.

On the other hand, if the requested URL has a referral URL (step 324), then a determination is made as to whether the requested URL and the referral URL are from the same domain (step 326). This may be achieved by comparing the domain name included in the two URLs.

Steps 322 and 323 and step 324 may be performed in an order different from the one described above. Alternatively, step 324 may be performed first to check whether the requested URL has a referral URL, followed by steps 322 and 323 to compare the requested URL and its referral URL against the access map 360 when the requested URL is not a starting URL, i.e., having a referral URL. Step 326 may then follow if the requested URL and its referral URL are not found in the access map 360.

If the requested URL and its referral URL are from different domains (step 326), this means that the URL request is a cross-domain request. A determination is made as to whether the requested URL is critical (step 327), such as corresponding to a web page that contains important operations. However, even if the requested URL is considered critical, the request may still be authorized. Not all cross-domain requests for critical URLs are always unauthorized and suffering from CSRF attacks. Thus, a determination is made as to whether the URL request is authorized (step 328). Whether a cross-domain request for a critical URL is authorized may depend on various factors or criteria and such factors or criteria may vary from domain to domain or website to website. In some embodiments, each domain or website may predefine certain criteria to specify under what circumstances such a request is authorized or unauthorized. The URL detecting process 320 may then use these criteria to make a determination. Alternatively or in addition, the user may be given the option of authorizing or denying such a cross-domain request. For example, a popup window may be used to attract the user's attention and ask the user whether he or she will authorize this particular cross-site request. If the user chooses to authorize the cross-site request, then the requested URL and the referral URL, if one exists, are sent to the access map building process 340 to be added to the user's access map (step 325). If the user chooses to deny the cross-site request, then the system does not respond to the request.

If the URL detecting process 320 determines that the URL request is authorized, it sends the requested URL with its referral URL to the access map building process 350 so that this pair of requested URL and referral URL may be added to the access map 360 (step 325). Otherwise, if the URL request is not authorized, then an alert 330 may be raised.

On the other hand, if the requested URL and its referral URL are from the same domain (step 326), this means that the URL request comes within the same domain. In this case, it is less likely that the URL request may be a CSRF attack. Nevertheless, the URL detecting process 320 has the option of further checking whether the URL request is authorized or not, in case the web server itself is compromised. It is possible that an attacker may trick a web server into incorporating a malicious URL request somewhere, e.g., in a web page, within the server. In this case, the potential harm or damage may be much greater, since many users may be affected.

If the URL detecting process 320 is configured to further check the URL request (step 329), it may proceed to steps 327 and 328 as described above. Otherwise, the URL detecting process 320 may be configured to trust the URL request when its referral URL is from the same domain. In this case, the pair of requested URL and referral URL is sent to the access map building process 340 so they may be added to the access map 360 (step 325).

Figure 6:
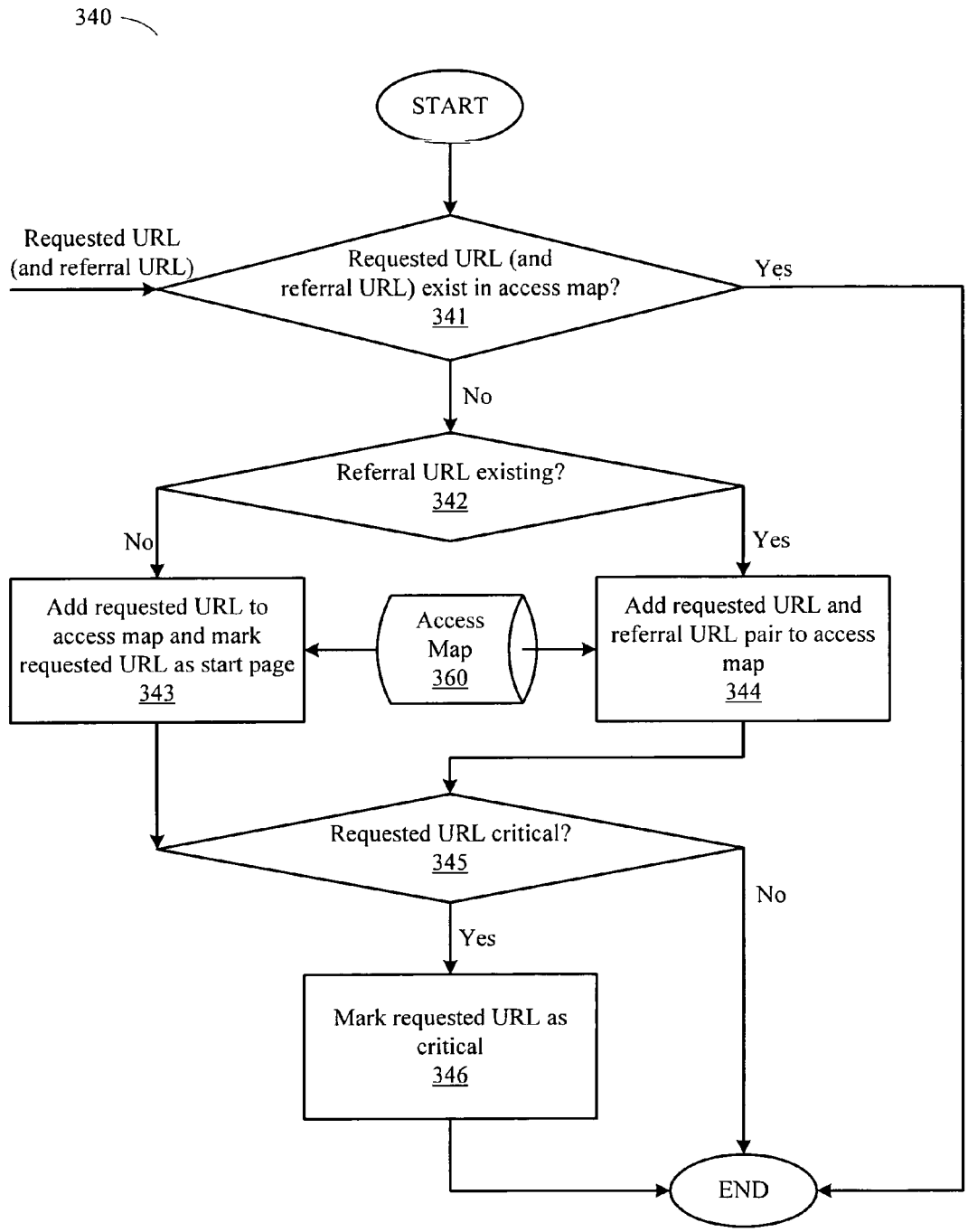
FIG. 6 illustrates an access map building process according to one embodiment of the invention.

FIG. 6 illustrates an access map building process 340 according to one embodiment of the invention. According to this embodiment, when the access map building process 340 receives a requested URL and optionally a corresponding referral URL, it first verifies whether the requested URL and the optional referral URL already exist in the access map 360 (step 341). If so, then there is no need to add the URL(s) to the access map 360 again.

Otherwise, the access map building process 340 determines whether the referral URL exists (step 342). If there is no referral URL for the requested URL, then the requested URL may be considered a starting URL as it is added to the access map 350. In this case, the requested URL is added to the access map 360 and marked as a starting URL (step 343). If there is a corresponding referral URL, then the requested URL is not a staring URL. The pair of requested URL and referral URL is added to the access map.

The access map building process 340 may determine whether the requested URL is critical based on the criteria defined by the user or the domain (step 345). If the requested URL is critical, then it is marked as critical in the access map 360 (step 346).

Optionally, a timestamp may be stored with the requested URL in the access map 360, which may indicate either the time the requested URL is added to the access map 360 or the time the URL request is made. This timestamp may be used, for example, during maintenance procedure for the access map. The system may specify that a particular requested URL and its referral URL are kept in the access map 360 for a certain period of time, and older pairs of requested URL and referral URL are periodically removed if no requests are made to those URLs after some period of time, so that the information in the access map 360 stays current and/or the size of the access map 360 is kept reasonable or manageable.

Figure 7:
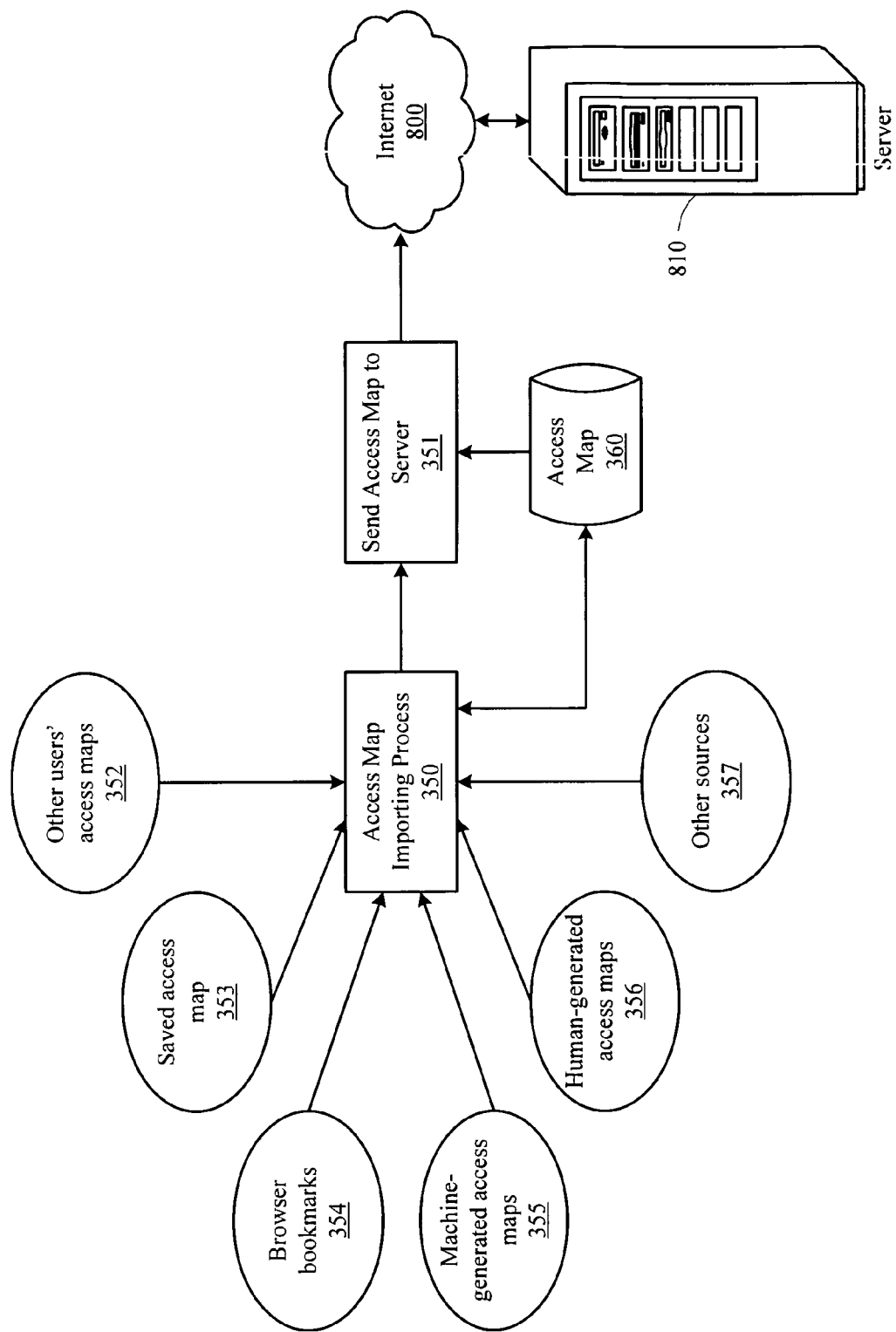
FIG. 7 illustrates some of the sources from which an access map importing process may import data for constructing and updating a user's access map.

In addition to the processes described above, the system may also include an access map importing process 350 as a part of the access map 360 maintenance functionalities. The access map importing process 350 may proceed in parallel with the other processes. FIG. 7 illustrates some of the sources from which an access map importing process 350 may import data for constructing and updating a user's access map 360. A user may have one or more access maps, and the access map importing process 350 may be configured to maintain all access map(s) belonging to a user.

Since each user has his or her own access map(s), access maps from other users 352 may be imported and incorporated into a user's access map(s). Existing access maps saved in various types of databases or on various types of severs 353 may also be imported. The user's web browser bookmarks 354 may be used to determine those URLs that the user frequently visits, and these bookmarked URLs are generally considered starting URLs to their respectively domains. Similarly, the browsing history stored in the user's web browser may be used to construct legitimate URL paths.

A standard access map may be generated by computers 355. For example, a computer program may automatically and systematically parse all the web pages within a domain or website to determine all the possible URL paths within the domain. At the same time, URL paths may be manually specified by the user himself or herself, or by system administrators 356.

Of course, the sources shown in FIG. 7 are not exhaustive. The access map importing process 350 may obtain relative information from other sources 357 and incorporate such information into the user's own access map 360. Some of the information may be downloaded via the Internet 800, while other information may be locally available to the user.

The access map importing process 350 may from time to time update the user's own access map 360 with information from these various sources 352, 353, 354, 355, 356, 357. Optionally, after the user's access map 360 has been updated, it may be sent to a server 810 via the Internet 800 for storage. Server 810 may be a back-end server that is used to maintain access maps from all users. This enables each user to have access to other users' access maps. Furthermore, server 810 may optionally merge access maps from multiple users to create a comprehensive access map, e.g., a master access map, which may be used as a default access map for new users who do not yet have their own personal access map(s).

Figure 8:
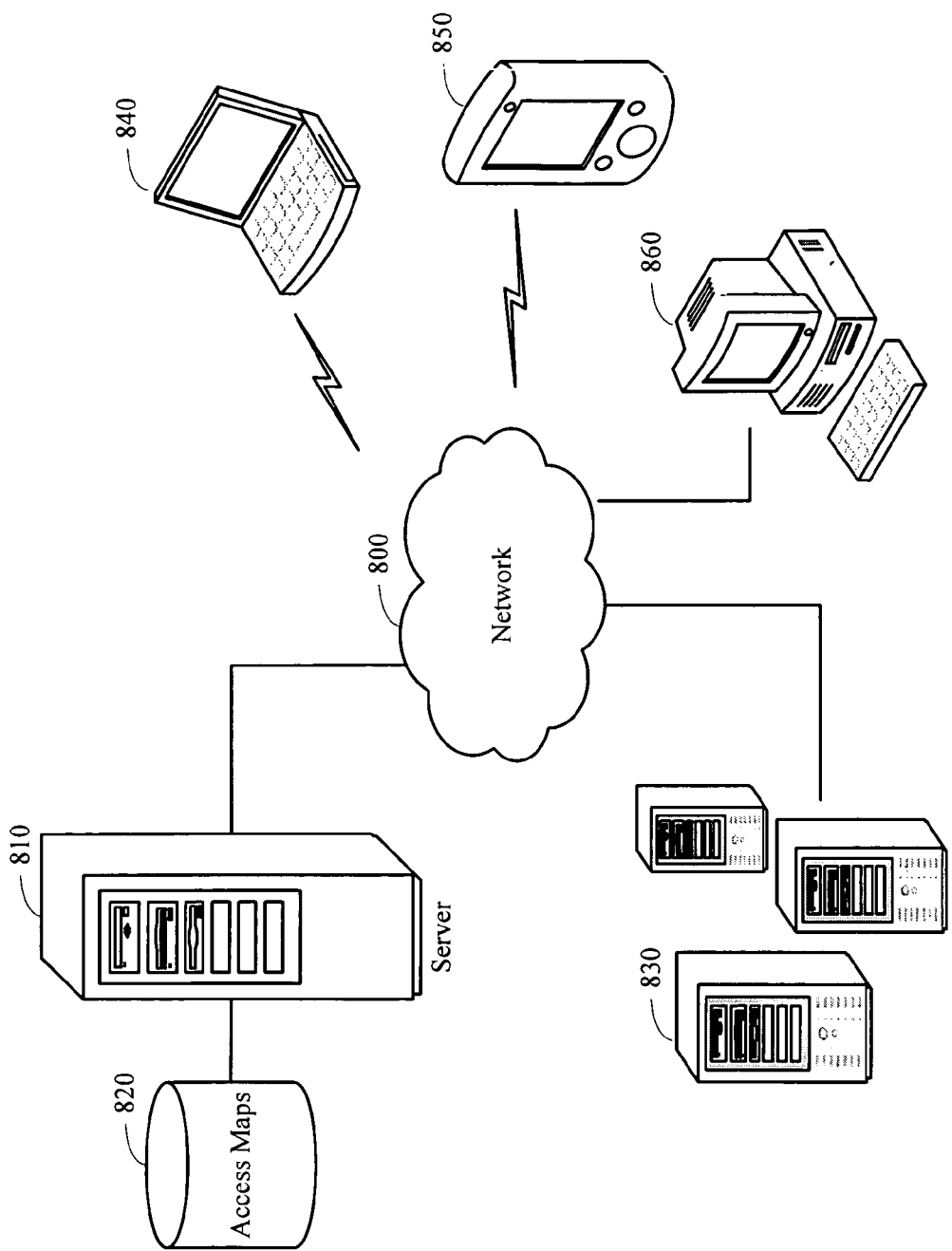
FIG. 8 is a simplified diagram of a network environment in which specific embodiments of the present invention may be implemented.

FIG. 8 is a simplified diagram of a network environment in which specific embodiments of the present invention may be implemented. The various aspects of the invention may be practiced in a wide variety of network environments (represented by network 800) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations. The URL request detection system 300 may be implemented as computer software programs and may be executed either on client devices such as desktop computer 860, notebook computer 840, handheld computer 850, etc., or on servers such as web application servers 830 or back-end server 810. The actual implementation of the system may vary.

One or more databases, e.g., database 820, may be communicatively linked to the back-end server 810 for storing access maps from various users. For example, the access map importing process 350 running on each user's client device, e.g., 840, 850, and 860, may send the user's access map(s) to the back-end server 810 periodically and the back-end server 810 may store such access map in the database 820.

The servers and the clients may communicate with each other through the Network 800, and they may access the Network 800 either via wired connections or wireless connections.

Figure 9A:
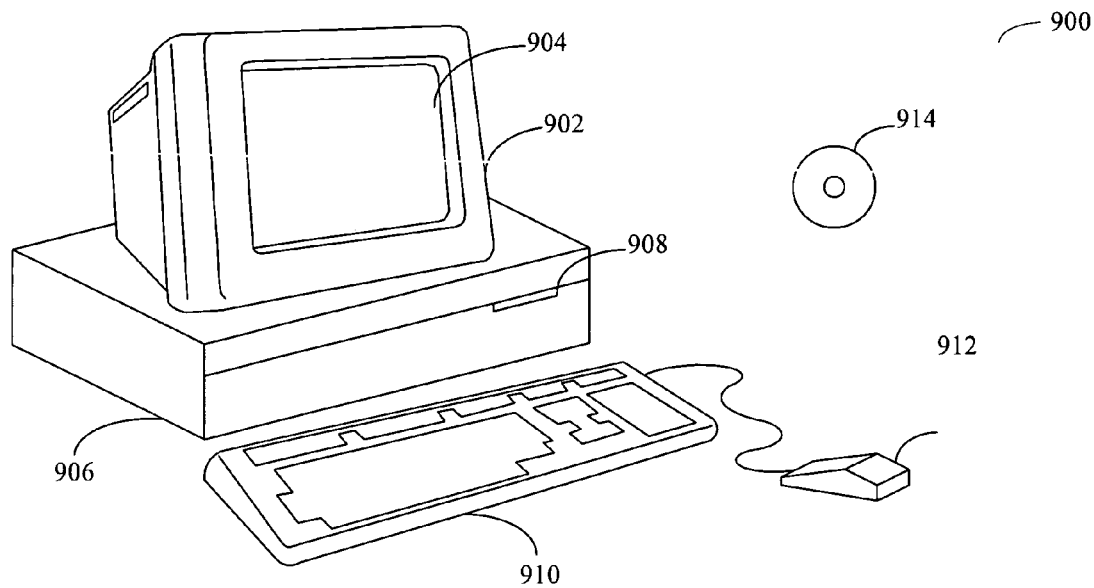
FIGS. 9A and 9B illustrate a computer system suitable for implementing embodiments of the present invention.
Figure 9B:
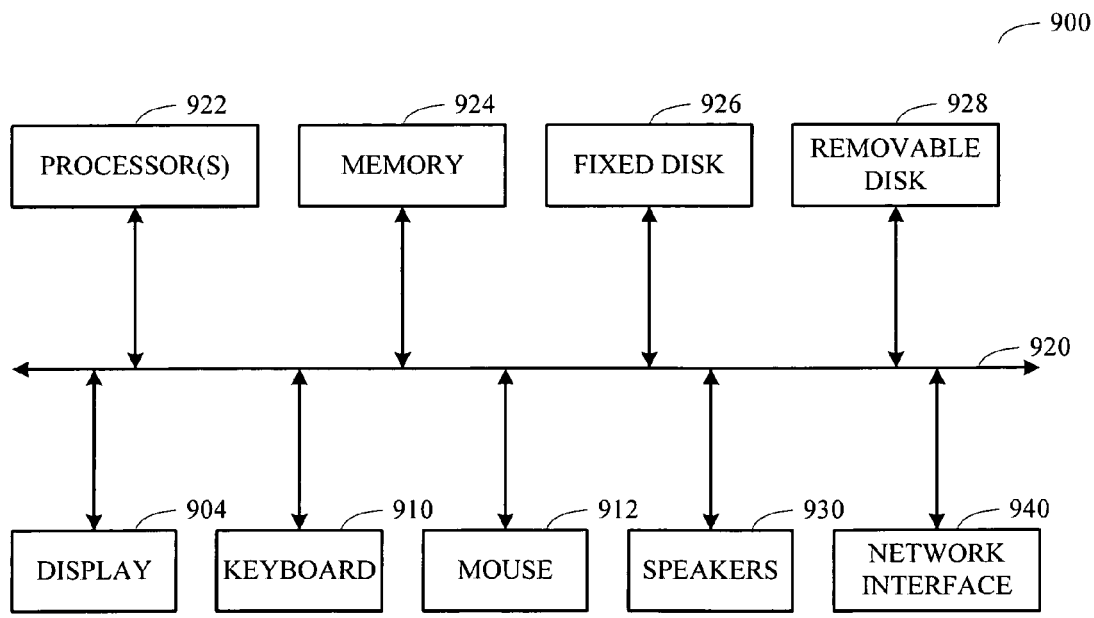

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 928 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

The URL request detection system may be implemented either on a client device or on a server, e.g., a back-end server or a web application server. Thus, even if a web application server does not provide the capability of detecting and preventing CSRF, individual users still have the option of having a detection system on their client devices.

While this invention has been described in terms of several preferred embodiments, there are alterations, permutations, and various substitute equivalents, which fall within the scope of this invention. It should also be noted that there are many alternative ways of implementing the methods and apparatuses of the present invention. For example, despite the references to the Internet and virtual communities above, embodiments are contemplated in which most or even all of the functionalities described herein for generating a profile are performed on a single, stand-alone computing device. It is therefore intended that the following appended claims be interpreted as including all such alterations, permutations, and various substitute equivalents as fall within the true spirit and scope of the present invention.

What is claimed is:

1. A method of detecting unauthorized URL (Uniform Resource Locator) requests on a client computer, comprising:

constructing, at said client computer, an access map indicating allowed paths between URLs, said constructing based in part on an online browsing history of said client computer, wherein said access map further includes an indication of a starting URL and an indication of a critical URL;

receiving a requested URL at said client computer, wherein the requested URL is a part of a request from said client computer to a server computer;

determining a referral URL associated with said requested URL;

comparing said requested URL and said referral URL associated with the requested URL against said access map;

determining, before forwarding said request to said server computer from said client computer, whether the request is authorized depending upon whether a path from said referral URL to said requested URL exists based on the access map;

forwarding said request to said server computer from said client computer when said path from said referral URL to said requested URL exists; and raising an alert at said client computer when said path from said referral URL to said requested URL does not exist based on said access map, when said requested URL is said critical URL and when said requested URL and said referral URL belong to different domains, wherein the request is not authorized and is not sent by said client computer.

2. The method, as recited in claim 1, further comprising:
receiving the request; and
filtering the requested URL based on a set of criteria, wherein the set of criteria is at least one selected from the group consisting of safe categories of URLs, unsafe categories of URLs, safe list of URLs, and unsafe list of URLs.

3. The method, as recited in claim 1, further comprising:
adding the requested URL and the referral URL to the access map if the request is authorized and the requested URL and the referral URL are not a part of the at least one legitimate URL path.

4. The method, as recited in claim 1, further comprising:
importing legitimate URL paths from other access maps to the access map.

5. A computer program product for detecting unauthorized URL requests, the computer program product comprising a computer-readable storage device having a plurality of computer program instructions stored therein, which are operable to cause a client computer to:

construct an access map indicating allowed paths between URLs at said client computer, said access map based in part on an online browsing history of said client computer, wherein said access map further includes an indication of a starting URL and an indication of a critical URL;

receive a requested URL at said client computer, wherein the requested URL is a part of a request from a client computer to a server computer;

determine a referral URL associated with said requested URL;

compare said requested URL and said referral URL associated with the requested URL against said access map;

determine, before forwarding said request to said server computer from said client computer, whether the request is authorized depending upon whether a path from said referral URL to said requested URL exists based on the access map;

forward said request to said server computer from said client computer when said path from said referral URL to said requested URL exists; and raise an alert at said client computer when said path from said referral URL to said requested URL does not exist based on said access map, when said requested URL is said critical URL and when said requested URL and said referral URL belong to different domains, wherein the request is not authorized and is not sent by said client computer.

6. The computer program product, as recited in claim 5, wherein the plurality of computer program instructions are further operable to cause at least one computing device to:
receive the request;
filter the requested URL based on a set of criteria, wherein the set of criteria is at least one selected from the group consisting of safe categories of URLs, unsafe categories of URLs, safe list of URLs, and unsafe list of URLs; and
determine the referral URL associated with the requested URL.

7. The computer program product, as recited in claim 5, wherein the plurality of computer program instructions are further operable to cause at least one computing device to:
add the requested URL and the referral URL to the access map if the request is authorized and the requested URL and the referral URL are not a part of the existing URL path; and
import legitimate URL paths from other access maps to the access map.

8. The method as recited in claim 1 further comprising:
examining a Web browser of the client computer in order to determine said referral URL.

9. The computer program product as recited in claim 5, said product further comprising program instructions operable to:
examine a Web browser of the client computer in order to determine said referral URL.

10. The method as recited in claim 1 wherein said request is a cross domain request, said method further comprising:
giving a user of the client computer an option of authorizing or denying said cross domain request.

11. The computer program product as recited in claim 5, said product further comprising program instructions operable to:
giving a user of the client computer an option of authorizing or denying said cross domain request.

12. The method as recited in claim 1 wherein said URLs include a plurality of domains.

13. The method as recited in claim 1 wherein said browsing history is taken from a Web browser of said client computer.

14. The computer program product as recited in claim 5, wherein said URLs include a plurality of domains.

15. The computer program product as recited in claim 5, wherein said browsing history is taken from a Web browser of said client computer.

* * * * *